(12) United States Patent
Long

(10) Patent No.: US 10,790,645 B1
(45) Date of Patent: Sep. 29, 2020

(54) TOOL FOR REMOVING A SPLICE FROM A POWER LINE

(71) Applicant: Andrew Scott Long, Lavaca, AR (US)

(72) Inventor: Andrew Scott Long, Lavaca, AR (US)

( * ) Notice: Subject to any disclaimer, the term of this patent is extended or adjusted under 35 U.S.C. 154(b) by 0 days.

(21) Appl. No.: 16/532,126

(22) Filed: Aug. 5, 2019

Related U.S. Application Data

(62) Division of application No. 15/090,130, filed on Apr. 4, 2016, now Pat. No. 10,374,399.

(51) Int. Cl.
*H02G 1/00* (2006.01)

(52) U.S. Cl.
CPC ................... *H02G 1/005* (2013.01)

(58) Field of Classification Search
CPC ..................................................... H02G 1/005
See application file for complete search history.

(56) References Cited

U.S. PATENT DOCUMENTS

| 7,670,197 B2 | 3/2010 | Janulis et al. |
| 2006/0110983 A1 | 5/2006 | Muench et al. |

FOREIGN PATENT DOCUMENTS

| EP | 0 861 678 A2 * | 9/1998 |
| EP | 1 136 860 A2 * | 9/2001 |
| EP | 1 655 627 A2 * | 5/2006 |
| WO | 2011/025637 A1 * | 3/2011 |

* cited by examiner

*Primary Examiner* — Carl J Arbes
(74) *Attorney, Agent, or Firm* — Frank J. Catalano; Gable Gotwals

(57) ABSTRACT

A tool facilitates removal of a splice used to serially connect lengths of cable into an electrical power line. The tool has an elongated slide of semi-circular cross-section with outer and inner diameters suited to saddle the cable and snugly enter into an open end of the splice and into abutment against a spring-biased split-ring vise grip in the splice. With the leading end of the tool butted against the spring-biased vise grip, application of manual force to a handle on the trailing end of the tool drives the vise grip to compress its biasing spring, expanding the vise-grip and releasing the cable for removal from the vise grip and the splice without damaging the splice or cutting the cables connected to the splice.

3 Claims, 3 Drawing Sheets

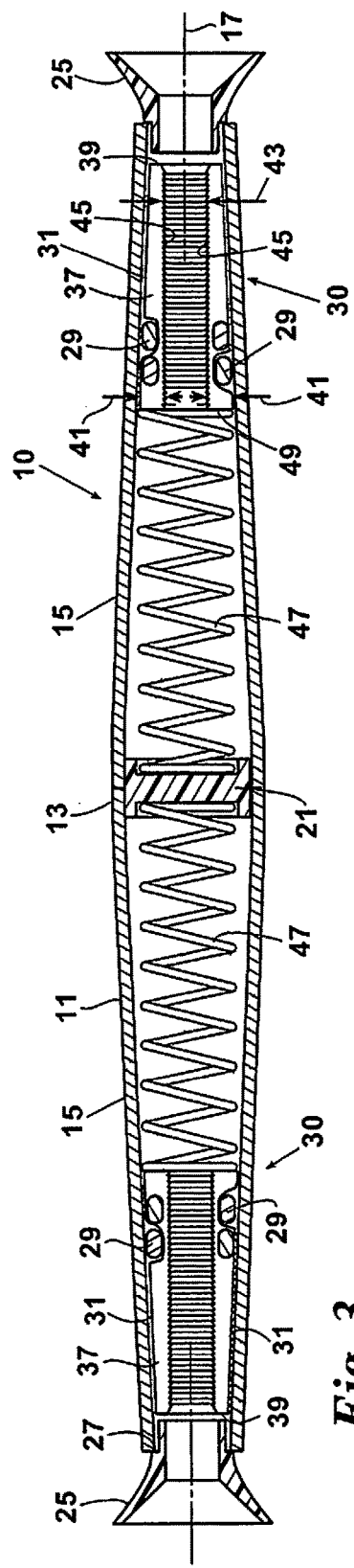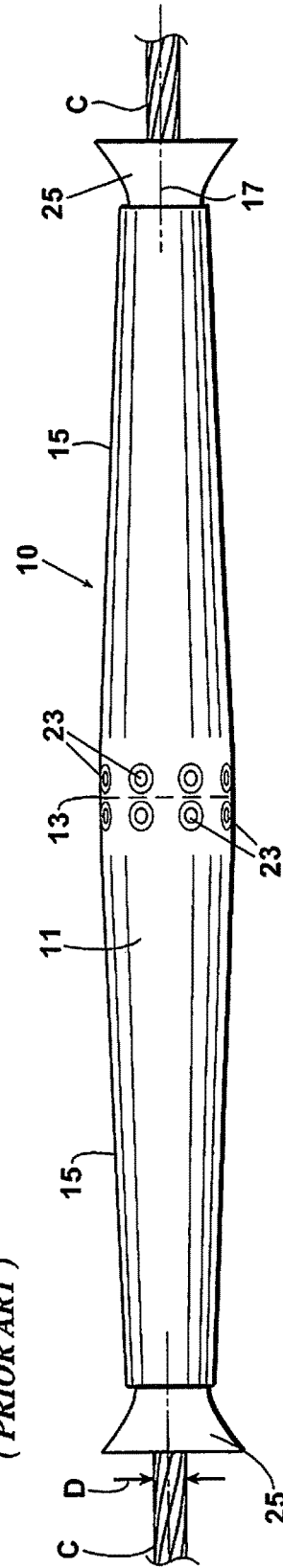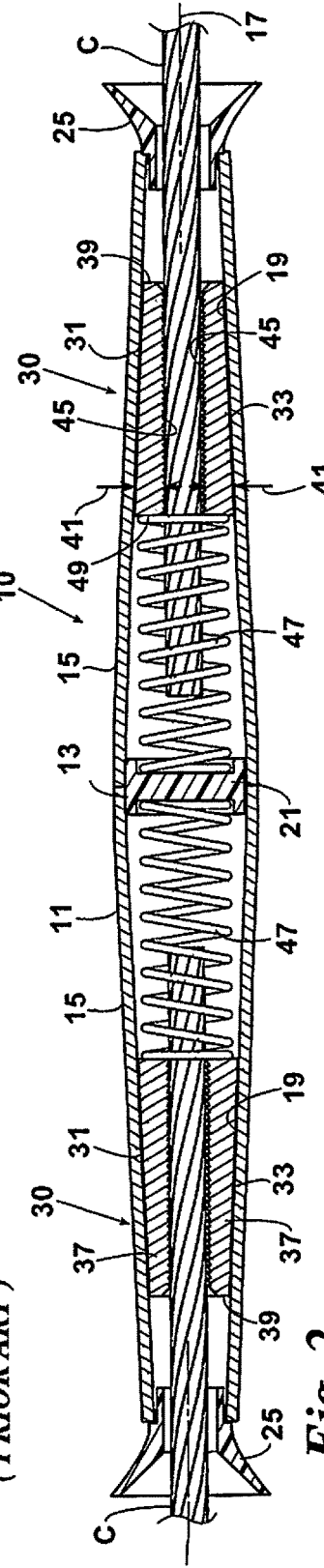

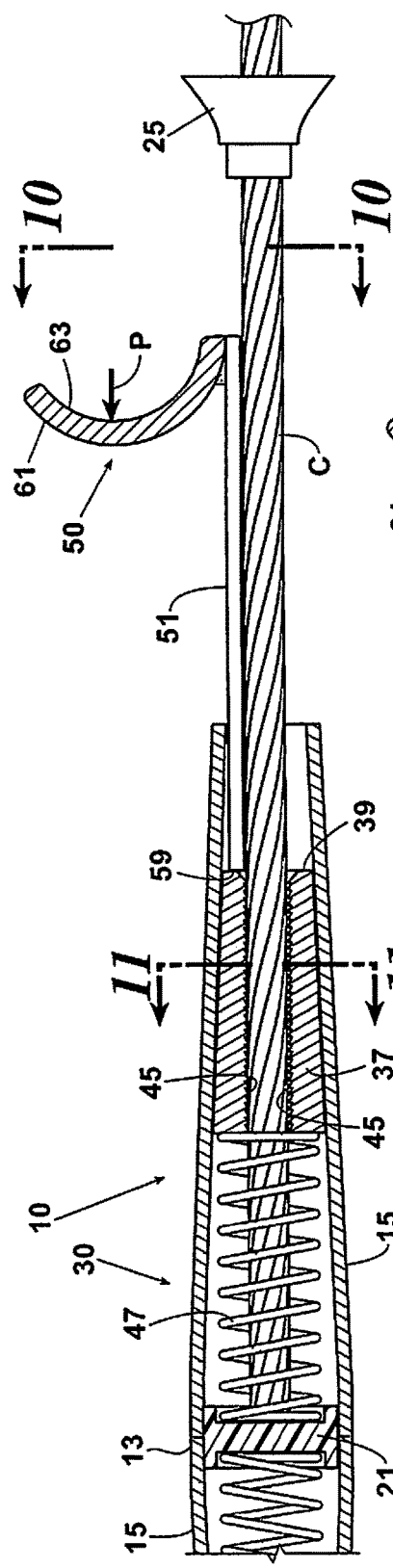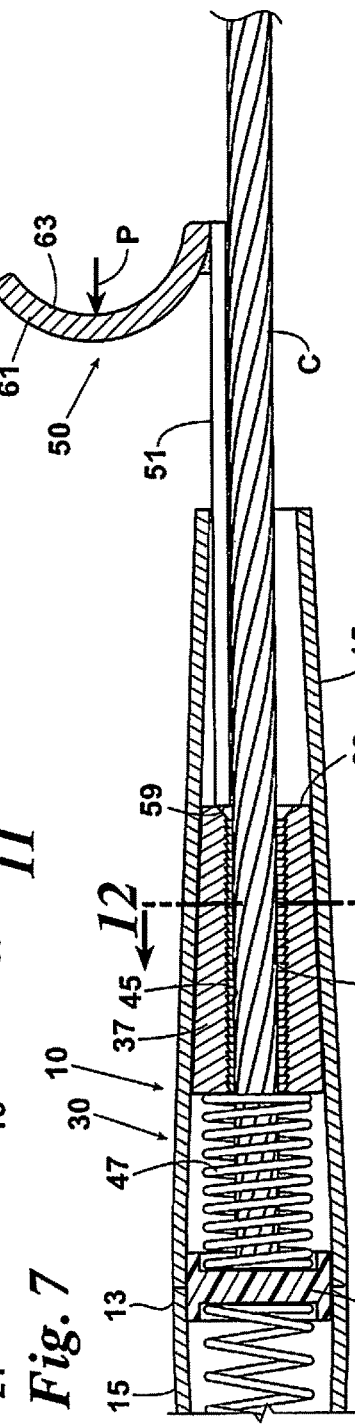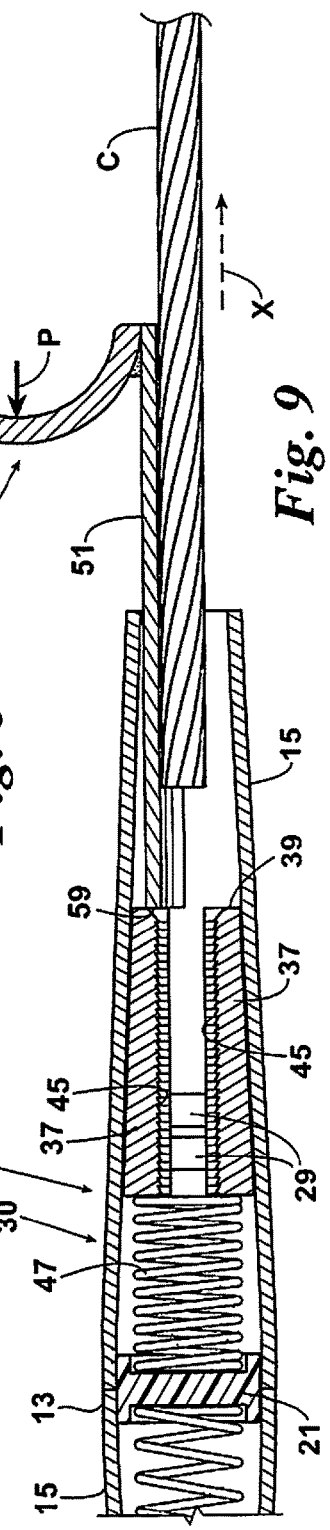

TOOL FOR REMOVING A SPLICE FROM A POWER LINE

CROSS-REFERENCE TO RELATED APPLICATION

The present application is a divisional application of U.S. application Ser. No. 15/090,130, entitled, Method of Removing a Splice from a Power Line, now U.S. Pat. No. 10,374,399.

BACKGROUND OF THE INVENTION

The present invention relates generally to the installation and maintenance of overhead electrical power cables and more particularly concerns the splices used to serially connect lengths of cable.

At the time of cable installation, if cables are too short, a lineman will use a splice to serially connect available lengths of cable to span the necessary distance. If a line breaks, a lineman may have to use a double splice to complete the length of a cable. If a cable is damaged, a lineman will have to cut out the damaged section and splice the original cable, or perhaps double splice a piece of cable into the original cable.

Even when properly installed with or without a splice, cables are typically of braided or twisted aluminum with a steel strand, and will sag over time under their own weight. Sometimes environmental conditions, such as icing during a winter storm, will add sufficient weight to a cable to cause almost immediate sag. Whatever the cause, the dangers of sag in power cables is well-known. When unacceptable sag has occurred, a lineman will cut the sagging cable, remove a section of the cut cable to adjust the cable length and use a splice to serially connect the cut ends of the cable.

Presently known cable splices include a housing in the form of an elongated tube which is symmetrical about a longitudinal axis and in relation to a perpendicular center plane. The elongated tube has a short cylindrical center section with long tapered extensions aligned on the longitudinal axis. The tube center section is stamped against a disc in concentric disposition in the center of the center section.

Each tapered extension contains an elongated split-ring vise grip shorter than its extension. An inner constant-diameter serrated surface complements the outer diameter of the cable to be spliced. An outer tapering diameter complements the taper of the inside wall of the extension. Opposed cable ends are gripped in the splice by the serrated surface, the serrations permitting insertion and preventing withdrawal of the cables into and out of the splice.

Each tapered extension has a spring coiled about the housing longitudinal axis with one end butted against the plastic disc and the other end butted against the thick-wall end of the split-ring vise grip. The spring is capable of compressing until the inner diameter of the split-ring has opened sufficiently to receive the cable to be spliced and of expanding until the tapered outside wall of its vise-grip abuts the tapered inside wall of the extension. Each tapered extension also has a plastic funnel fitting guiding its respective cable end into the clamping inner diameter of its vise-grip.

In association with the known splice, and in accordance with present practice, once a splice has been installed the expanded spring and vise-grip prevent removal of the splice. Since cutting the cable is generally undesirable, a lineman will cut the splice at the plastic disc, destroying the splice but releasing the cable. One lineman may destroy many splices on a typical day.

It is, therefore, an object of this invention to provide a tool for and method of removing a splice from an electrical power cable without destroying the splice. It is also an object of this invention to provide a tool for and method of removing a splice from an electrical power cable that simplifies the process of splice removal. It is a further object of this invention to provide a tool for and method of removing a splice from an electrical power cable that simplifies the process of reconnecting the cable.

SUMMARY OF THE INVENTION

In accordance with the invention, a tool is provided for removing a splice serially connecting lengths of cable to form an electrical power line.

The splice has a housing with a cylindrical center section and elongated frustum extensions aligned on a longitudinal axis. The center section contains a disc in concentric disposition at the center of the center section. Each extension contains an elongated frustum split-ring vise-grip. The segments of the split-ring grip have inner constant-diameter serrated surfaces which are capable of clamping against the outer diameter of the cable to be spliced. The outer surface of the frustum split-ring vise-grip complements the inner surface of the frustum extension and causes the vise-grip to close on the cable as the vise-grip slides distally against the extension. A spring coiled about the housing longitudinal axis with one end butted against the disc and the other end butted against the proximal end of the split-ring vise-grip biases the vise-grip toward closure.

The tool has an elongated slide of semi-circular cross-section. The outer diameter of the slide is substantially equal to the narrowest inner diameter of the tapered extension. The inner diameter of the slide is substantially equal to the outer diameter of the cable. The slide has a transverse planar surface on its leading end and a handle on its trailing end. When the inner diameter of the slide is seated against the outer diameter of the cable and the leading end of the slide is butted against a proximal end of the split-ring vise grip, manual force applied to the handle in a longitudinal axial direction toward the leading end of the slide drives the split-ring vise grip to compress the spring and expand the split-ring vise-grip, releasing the cable for removal from the vise grip without damaging the splice or cutting a cable.

The tool may also have a handle on a trailing end of slide adapted to facilitate pushing the slide into the extension of the splice and against the distal end of the corresponding spring-biased vise-grip. The handle may also be adapted to prevent penetration of the vise-grip into the extension of the splice beyond a point of possible disengagement of the tool from the vise-grip.

The method for removing the splice from the electrical power line includes the steps of saddling a tool on the cable to be released distally of the splice, pushing the tool into an open end of the splice and into abutment with the distal end of the spring biased vise-grip in the splice and continuing to push the tool to penetrate further into the splice against the bias of the spring until the cable is released from the vise-grip.

The method will, if the splice has a funnel-shape guide at one end thereof, be preceded by the step of sliding the funnel-shaped guide along the connected cable away from the splice by a distance greater than the length of the tool.

The method may also include the step of allowing the released cable to slide out of the splice.

BRIEF DESCRIPTION OF THE DRAWINGS

Other objects and advantages of the invention will become apparent upon reading the following detailed description and in reference to the drawings in which:

FIG. 1 is a side elevation view of known cable splice installed on a cable;

FIG. 2 is a vertical plane diametric cross-sectional view of the installed cable splice of FIG. 1;

FIG. 3 is a horizontal plane cross-sectional view of the cable splice of FIG. 1 prior to installation;

FIG. 7 is a vertical plane partial diametric cross-sectional view illustrating the splice-removing tool of FIG. 4 inserted into abutment with a split-ring vise grip of the installed splice of FIG. 1;

FIG. 8 is a vertical plane partial diametric cross-sectional view illustrating the splice-removing tool of FIG. 4 inserted to compress the biasing spring of the split-ring vise grip of the installed splice of FIG. 1 to release the cable;

FIG. 9 is a vertical plane partial diametric cross-sectional view illustrating the released cable being withdrawn from the splice-removing tool of FIG. 4 beneath the split-ring vise grip of the splice of FIG. 1;

Figure 6:
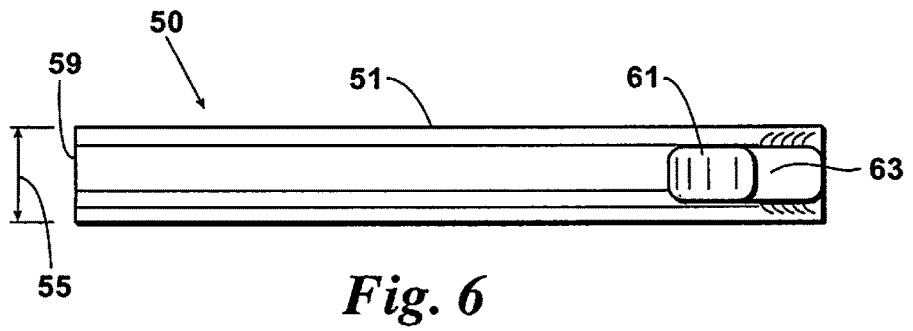
FIG. 6 is a top plan view of the tool of FIG. 4.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

A Typical Prior Art Splice

Turning first to FIGS. 1-3, a typical known splice 10 is shown serially connecting two lengths of electrical power cable C end-to-end into an electrical power line.

As seen in FIG. 1, the splice 10 has a housing 11 with a relatively short cylindrical center section 13 and elongated frustum extensions 15 aligned on a longitudinal axis 17. As seen in FIG. 2, the center section 13 contains a disc 21 concentrically secured in the center of the center section 13 by dimples 23 stamped into the center section 13. The housing 11 contains two frustum split-ring vise-grips 30, one in each of the frustum extensions 15.

Looking at FIGS. 2-3, each frustum vise-grip 30 has split-ring cross-sections 31 of outer diameter increasing from the free or distal end of the extension 15 toward its proximal end. As used herein, the terms "distal" and "proximal" relate to the disc 21 in the center section 13 of the splice 10. The outer surface 33 of the vise-grip 30 complements the inner surface 19 of its respective extension 15.

The split-ring cross-sections 31 provide a gap 35 of constant width between the two opposed segments 37 of the split-ring vise-grip 30. The gap 35 extends along the full length of the vise-grip 30. As shown, the gap 35 is preferably diametric and each segment 37 is less than 180°. Also as shown, the thickness 41 of each segment 37 increases along the length of the vise-grip 30 but has a constant inner diameter 43 not less than the diameter D of the spliced cables C. The inner diameters 43 of the segments 37 have opposed serrated surfaces 45 which facilitate insertion and prevent withdrawal of the cables C into and from the splice 10. With a cable C inserted between the segments 37 of a vise-grip 30, if the vise-grip 30 slides distally in its housing extension 15, the complemental frustum surfaces 19 and 33 cause the vise-grip 30 to close on the cable C. Tabs 29 engage the opposed segments 37 of the vise-grip 30 so that the segments 37 slide in unison in the extension 15.

To bias a vise-grip 30 to slide distally, a spring 47 is coiled about the longitudinal axis 17 of the splice 10 and inside of its extension 15. A proximal end of the coil spring 47 is butted against the disc 21 and a distal end of the coil spring 47 is butted against a proximal end 49 of the split-ring vise-grip 30. The length of the spring 47 is such that, in a low-compression state, the spring 47 secures the vise-grip 30 in a distal position with its outer surface 33 abutting the inner surface 19 of its extension 15. In a high-compression state, the spring 47 allows the vise-grip 30 to expand sufficiently at a proximal position to receive or release a cable C between or from the serrated surfaces 45 of the segments 37 of the vise-grip 30. In a mid-range-compression of the spring 47 and, as seen in FIG. 2, the cable C is securely gripped in the splice 10.

As best seen in FIGS. 1 and 2, each end of the splice 10 is fitted with a funnel shaped guide 25. The guide 25 has an inner diameter sized to snugly pass a cable C. A concentric seat 27 on the proximal end of the guide 25 aligns the guide 25 in the distal end of its corresponding extension 15 with the longitudinal axis 17 of the splice 10. The large diameter of the distal end of the funnel shaped guide 25 facilitates insertion of the cable C into the extension 15 and into alignment with the vise-grip 30. The guide 25 is free to ride on the cable C after the cable C is installed in the splice 10.

The splice 10 is symmetrical in relation to a horizontal plane through its longitudinal axis 17 and in relation to a vertical plane bisecting its length.

The Splice Removal Tool

Figure 4:
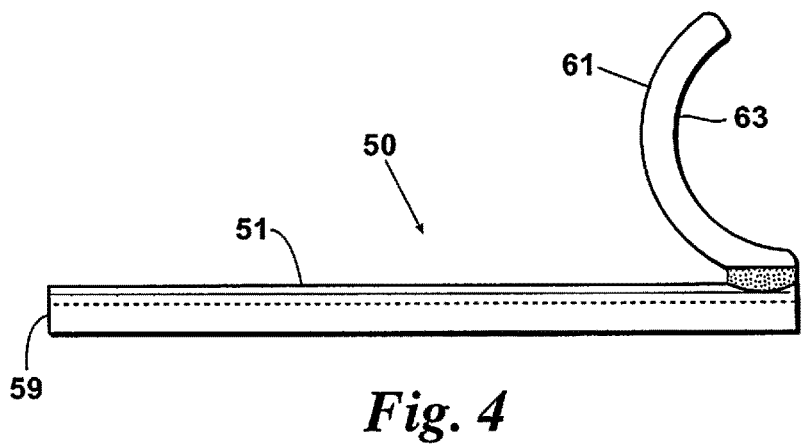
FIG. 4 is a side elevation view of a splice-removing tool according to the invention.
Figure 5:
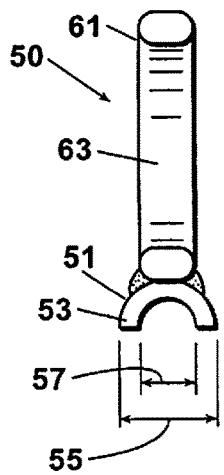
FIG. 5 is a trailing end view of the tool of FIG. 4.
Figure 10:
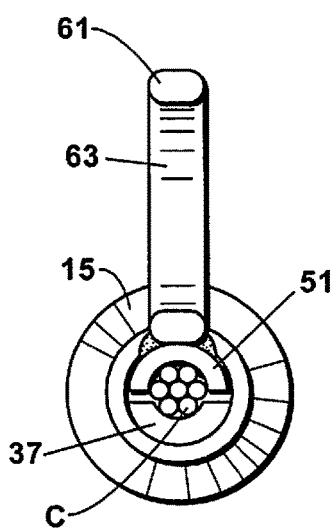
FIG. 10 is a cross-sectional view taken along the line 10-10 of FIG. 7.
Figure 11:
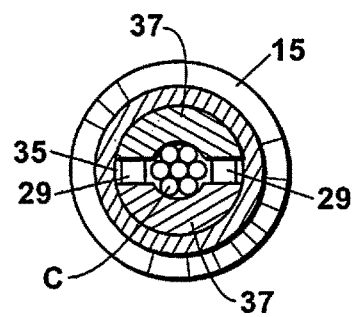
FIG. 11 is a cross-sectional view taken along the line 10-10 of FIG. 7.
Figure 12:
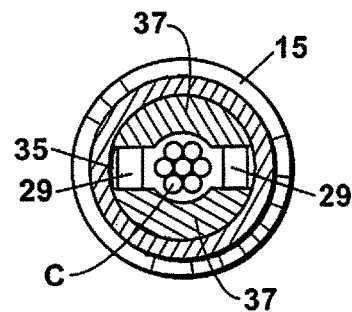
FIG. 12 is a is a cross-sectional view taken along the line 10-10 of FIG. 8.

Turning now to FIGS. 4-6, a splice-removal tool 50 in accordance with the invention has an elongated slide 51 of semi-circular cross-section 53. The slide 51 has an outer diameter 55 substantially equal to the narrowest inner diameter of a frustum extension 15 of the splice 10. The inner diameter 57 of the slide 51 is substantially equal to the outer diameter D of the cable C. Thus, the slide 51 will be able to saddle the cable C and pass snugly through the smallest diameter 19 of an extension 15 and into the splice 10.

The length of the slide 51 is at least sufficient to be capable of pushing a vise-grip 30 toward the center disc 21 of the splice 10 to a point at which the cable C is released from the vise-grip 30. The slide 51 has a planar surface 59 on its leading end and a handle 61 on its trailing end. As used herein, the terms "leading" and "trailing" relate to the disc 21 in the center section 13 of the splice 10. The planar surface 59 is adapted to engage the distal end 39 of the split-ring vise grip 30. The handle 61 is adapted, as shown by a concave contour 63, to facilitate pushing P of the slide 51 into an extension 15 of the splice 10 and against the distal end 39 of the corresponding spring-biased vise-grip 30. The handle 61 may also be adapted, as shown by the concave contour 63, to prevent penetration of the vise-grip 30 into the extension 15 of the splice 10 beyond a point of possible disengagement of the tool 50 from the vise-grip 30.

The tool 10 may be made of steel, aluminum, plastic, or other material suited to withstand compressive force of the spring 47.

The Method

Moving on to FIGS. 7-12, to use the splice-removal tool 50, a lineman slides the funnel-shaped guide 25 along a connected cable C away from the splice 10 by a distance greater than the length of the tool 50. If necessary, the lineman can apply tension to the cable to remove any undesirable slack. The tool 50 is then saddled on the cable C between the guide 25 and the splice 10. Using the distal and trailing handle 61, the lineman initially pushes P the tool 50 until the proximal or leading planar surface 59 of the tool 50 passes through the open end of the extension 15 of the splice 10 and into abutment with the distal or trailing end of the vise-grip 30. Continuing to use the handle 61 to push the tool 50, the lineman causes the proximal or leading planar surface 59 of the tool 50 to penetrate further into the extension 15 against the bias of the spring 47 until the cable C is released from the vise-grip 30. The lineman then allows the released cable C to slide out X of the splice 10. Either or both cables C can be removed from the splice 10 in which they are connected without damage to the splice 10 or cutting a cable C.

Thus, it is apparent that there has been provided, in accordance with the invention, a tool and method that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A tool for removing a spike serially connecting lengths of cable into an electrical power line, the splice having a housing with a cylindrical center section and elongated frustum extensions aligned on a longitudinal axis, the center section having a disc secured in the center section and each frustum extension containing an elongated frustum split-ring vise grip with an inner constant-diameter serrated surface complementing an outer diameter of the cable to be spliced, an outer frustum surface of the vise-grip complementing an inner frustum surface of the extension, and a spring coiled about the housing longitudinal axis with one end butted against the disc and the other end butted against a proximal end of the split-ring vise grip, the tool comprising an elongated slide having a semi-circular cross-section with an outer diameter substantially equal to a narrowest inner diameter of the frustum extension and an inner diameter substantially equal to the outer diameter of the cable, said slide having a planar surface on a leading end thereof and a handle on a trailing end thereof, whereby, with said inner diameter of said slide saddled on the outer diameter of the cable and said leading end of said slide butted against a distal end of the split-ring vise grip, manual force applied to said handle in a longitudinal axial direction toward the leading end of the slide drives the split-ring vise grip to compress the spring and expand the split-ring vise-grip, releasing the cable for removal from the vise-grip and the splice.

2. A toot according to claim 1 further comprising a handle on a trailing end of said slide, said handle being adapted to facilitate pushing said slide into an extension of the splice and against the distal end the corresponding spring-biased vise-grip 30.

3. A tool according to claim 2, said handle being further adapted to prevent penetration of the vise-grip into the extension of the splice beyond a point of possible disengagement of the tool from the vise-grip.

\* \* \* \* \*